No. 886,162. PATENTED APR. 28, 1908.
P. A. SWANSON.
HOG RING.
APPLICATION FILED JULY 31, 1907.
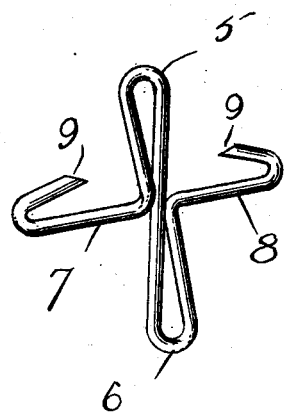
Witnesses
J. C. Simpson.
F. B. MacNab.
Inventor
Peter A. Swanson.
By Chandler & Chandler
Attorneys
THE NORRIS PETERS CO., WASHINGTON, D. C.

UNITED STATES PATENT OFFICE.

PETER A. SWANSON, OF LYNN CENTER, ILLINOIS.

HOG-RING.

No. 886,162.　　　Specification of Letters Patent.　　　Patented April 28, 1908.

Application filed July 31, 1907.　Serial No. 386,472.

*To all whom it may concern:*

Be it known that I, PETER A. SWANSON, a citizen of the United States, residing at Lynn Center, in the county of Henry, State of Illinois, have invented certain new and useful Improvements in Hog-Rings; and I do hereby declare the following to be a full, clear, and exact description of the invention, such as will enable others skilled in the art to which it appertains to make and use the same.

The present invention has reference to hog-rings and it aims to provide an exceedingly simple and inexpensive device of that nature adapted to be fastened in the snout of a hog, for effectively preventing the animal from rooting.

The invention will be readily understood from a consideration of the following detailed description and its preferred embodiment is illustrated in the accompanying drawings in which a perspective view of the device is shown.

The device which has the general shape of a Maltese cross, as shown, is constructed from a single strip of heavy steel wire bent so as to provide the oppositely disposed central loops 5 and 6 which form the vertical arms of the cross and the straight portions 7 and 8 which form the horizontal arms thereof, the sharpened extremities of the last-mentioned arms being bent backwardly and directed towards each other, to form the spurs 9, each horizontal arm being itself, a continuation of the free arm of the adjacent looped or vertical arm, so that the latter lie in the same vertical plane, the horizontal arms lying in a horizontal plane, as will be understood.

In attaching the device the spur arms are inserted in the nostrils of the animal and are then pressed together by a pair of pincers so as to penetrate the cartilage between the nostrils.

When the device is attached, as above described, it will be apparent that in attempting to root the hog will press the upper arm 5 into the earth and thereby prevent a forward movement of the nose, owing to such engagement of the arm and to the outward pull of the spur arms.

What is claimed, is,

A nose-ring for hogs formed of a single strip of wire bent into the shape of a Maltese cross, each vertical arm of the cross consisting of a flat loop, and each horizontal arm consisting of a right-angular extension of the free arm of the adjacent loop, the sharpened extremities of the last-mentioned arms being bent backwardly and directed towards each other to form spurs.

In testimony whereof, I affix my signature, in presence of two witnesses.

PETER A. SWANSON.

Witnesses:
 W. W. KERR,
 J. S. PETERSON.